FIG. I.

INVENTOR.
GEORGE A. LOEB

FIG. 2.

INVENTOR.
GEORGE A. LOEB

Nov. 4, 1958 G. A. LOEB 2,858,885
TICKET ISSUING AND ACCOUNTING SYSTEM
Filed Oct. 8, 1954 7 Sheets-Sheet 3

FIG. 3.

INVENTOR.
GEORGE A. LOEB
BY
ATTORNEYS

INVENTOR.
GEORGE A. LOEB

Nov. 4, 1958 G. A. LOEB 2,858,885
TICKET ISSUING AND ACCOUNTING SYSTEM
Filed Oct. 8, 1954 7 Sheets-Sheet 5

*INVENTOR.*
GEORGE A. LOEB
BY
ATTORNEYS

TICKET ISSUING AND ACCOUNTING SYSTEM

George A. Loeb, Rye, N. Y., assignor to General Register Corporation, Long Island City, N. Y., a corporation of New York Application October 8, 1954, Serial No. 461,205

4 Claims. (Cl. 164—48)

This invention relates to a ticket issuing and accounting system and particularly to a system for issuing zoned transportation tickets, the ticket supply strip therefor, tickets issued in accordance with the system and a machine for issuing such tickets.

In a zoned-fare transportation system as, for example, used on buses, both entrance to and exit from the vehicle must be controlled by the vehicle operating personnel. (For simplicity and consistency of description, the invention will be described as applied to buses, though it will be understood that it is equally applicable to other means of transportation.) As will be evident, the operating personnel, whether consisting of one or two persons, must be alert to the entrance and exit of each patron if full effect is to be given to the zoning regulations unless at each zone boundary an operator makes a trip through the bus for the collection of fare increments. When there is one operator this, obviously, delays the trip. If a pay-as-you-enter system is used, it is evident that the collection of proper fares depends upon the honesty of the patrons and the alertness of the operating personnel.

It is the general object of the present invention to provide a system which minimizes the possibility of dishonesty or mistake on the part of the patrons leading either to cheating of the bus company or embarrassment. In accordance with the invention, provision is made for both pay-as-you-enter or pay-as-you-leave operation. In fact, in a single transportation route, it is usually desirable to have both sysems operating, one for transportation in one direction and the other for transportation in the opposite direction. For example, consider a bus line which runs between an outlying district and the center of a city. In the case of an inbound trip, the patrons will enter the bus at many scattered points but they will leave the bus in large groups in the vicinity of the center of the city. In such case, the handling of fares is facilitated if the inbound trip is operated on a pay-as-you-enter basis, the operator readily taking care of the payment of fares as the scattered patrons enter the bus but being unable conveniently to collect the fares, without undue delay, at those points where large numbers of patrons disembark.

Conversely, in an outbound trip the concentration of patrons entering the bus in the vicinity of the city center will be very high, whereas they will disembark individually or in small groups. For the outbound trip, therefore, a pay-as-you-leave system is desirable.

However, there may well arise special conditions on that same bus line involving concentrations of entering or leaving partons such as, for example, service to the vicinity of some athletic event which may occur in the outlying portions of the city. In such cases, the rules for payment of fares may very well be reversed.

In accordance with the present invention, provision is made for the foregoing conditions in a zoned-fare transportation system. In the case of pay-as-you-enter operation, the patron on entering the bus specifies the zone to which he intends to ride and pays the appropriate fare and has issued to him a ticket which indicates the payment of the fare to the desired zone of exit. In this case, on departing from the bus, the patron returns the ticket to the operator who at a glance at a number on the ticket can ascertain that the departing patron has paid the appropriate fare. If the patron has ridden to a zone beyond that indicated for exit, a demand for the additional fare may be made.

In the case of a pay-as-you-leave system the patron himself issues a ticket which, by virtue of presetting of the issuing mechanism by the bus operator, will show the zone of entry. This ticket is delivered to the bus operator at the point of exit and the operator may at a glance note the zone of entry and ask the patron for the appropriate fare.

In particular, in accordance with the invention, provision is made to insure that the patron by cutting off a portion of a ticket cannot in either case lessen the apparent fare which is due. Severing a portion of a ticket will, in every case, make the patron liable for the payment of a higher fare than that for which the ticket was issued.

The objects of the invention are indicated above, and these more general objects as well as detailed objects relating to matters of machine, ticket strip, and ticket construction will be apparent from the following description read in conjunction with the accompanying drawings, in which.

The machine for issuing tickets to a patron by manual patron or operator operation will be first described.

Figure 1:
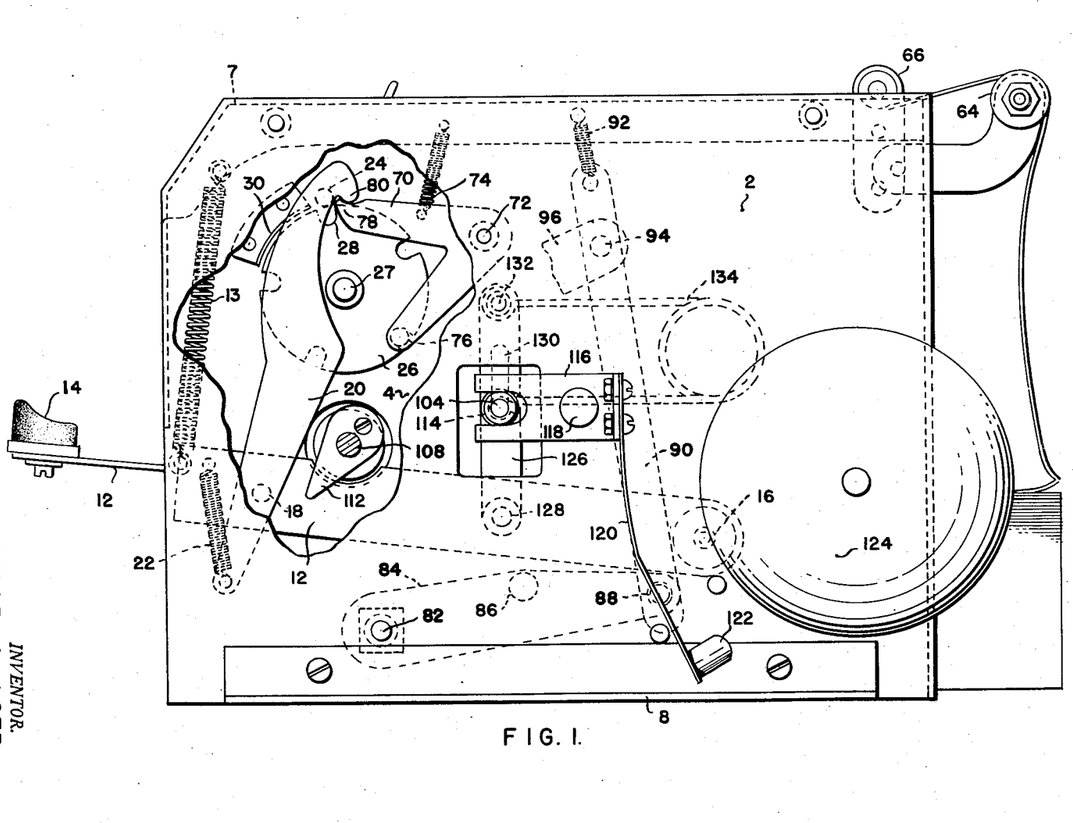
Figure 1 is an elevation partly broken away to show details of a preferred type of mechanism for issuing the tickets, the mechanism being viewed as indicated by the arrows 1—1 in Figure 4.
Figure 2:
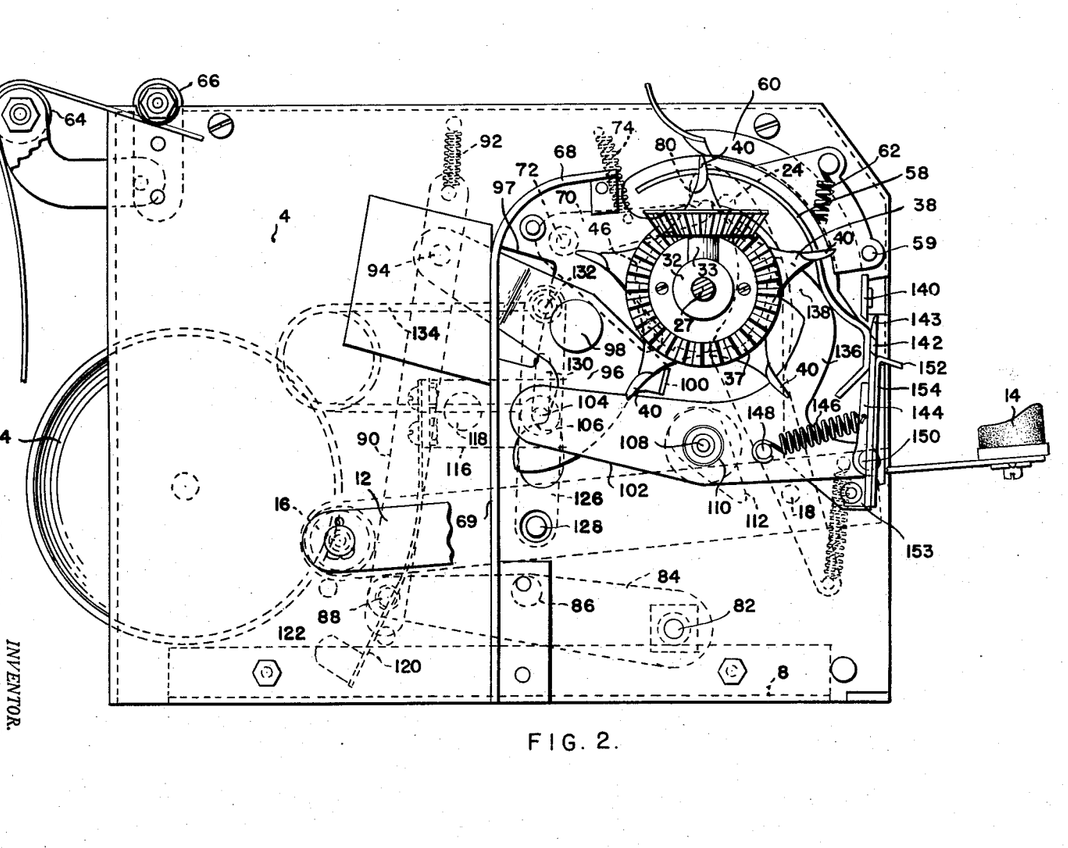
Figure 2 is a similar elevation of the opposite side of the mechanism with a side plate removed, together with certain elements attached thereto, the direction of viewing being indicated by the arrows 2—2 in Figure 4.
Figure 3:
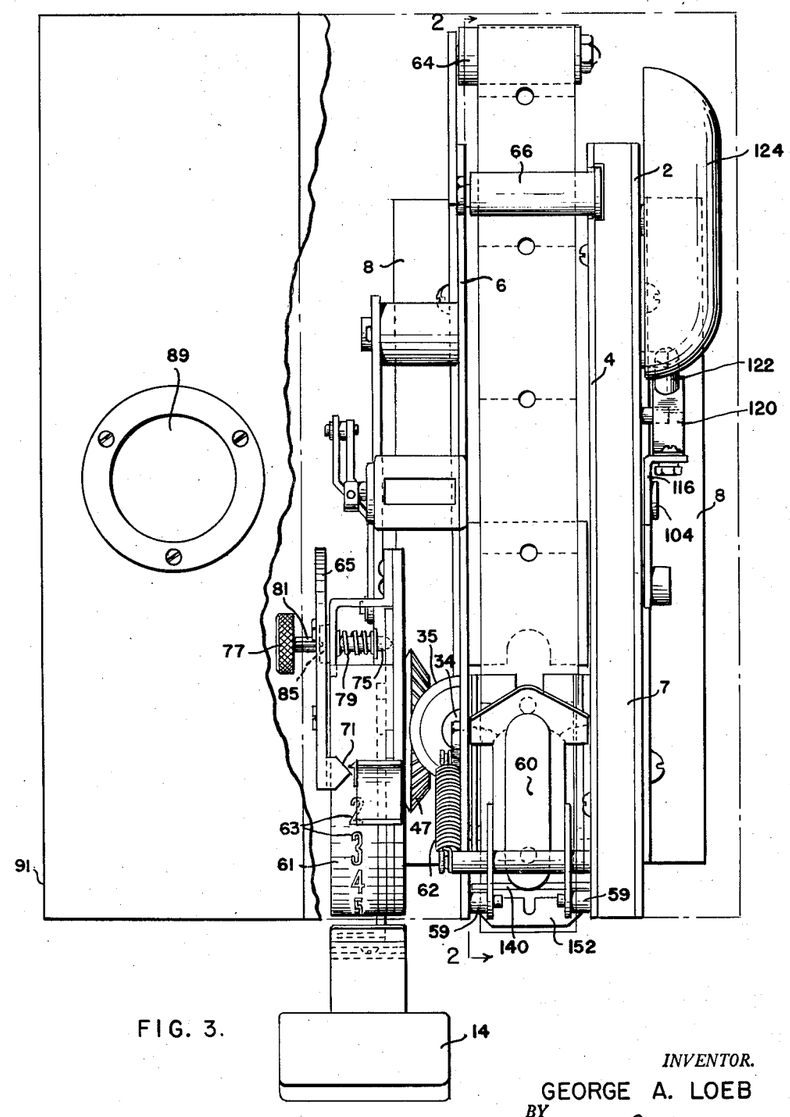
Figure 3 is a plan view of the machine with the housing partially broken away to show details of the operating mechanism.
Figure 4:
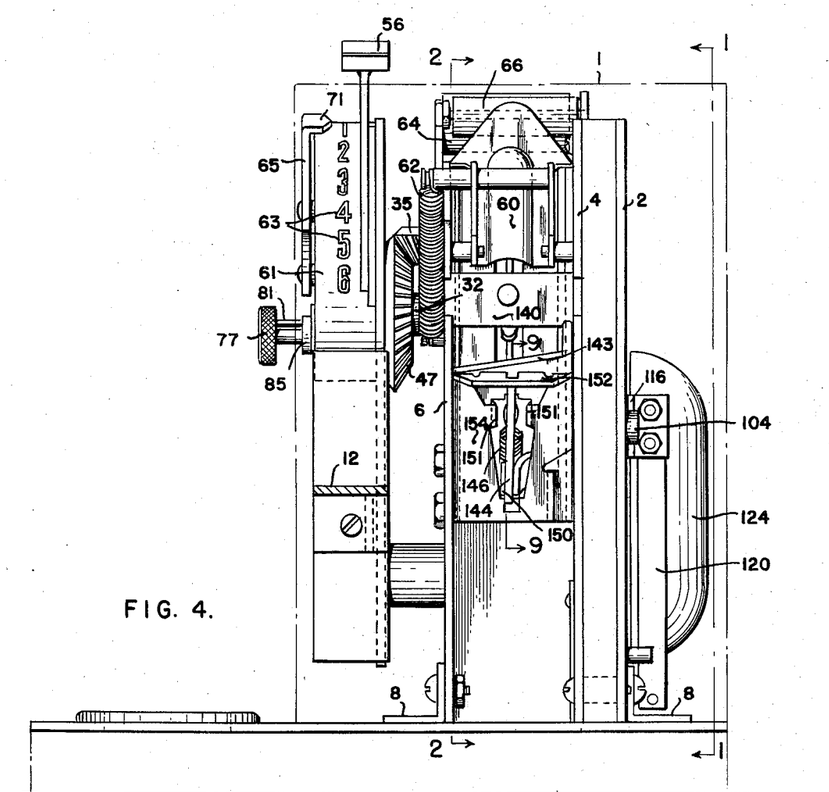
Figure 4 is a front elevation, partly in section, of the operating mechanism showing the top portion of the housing but with the portion enclosing the operating mechanism indicated in chain lines.
Figure 5:
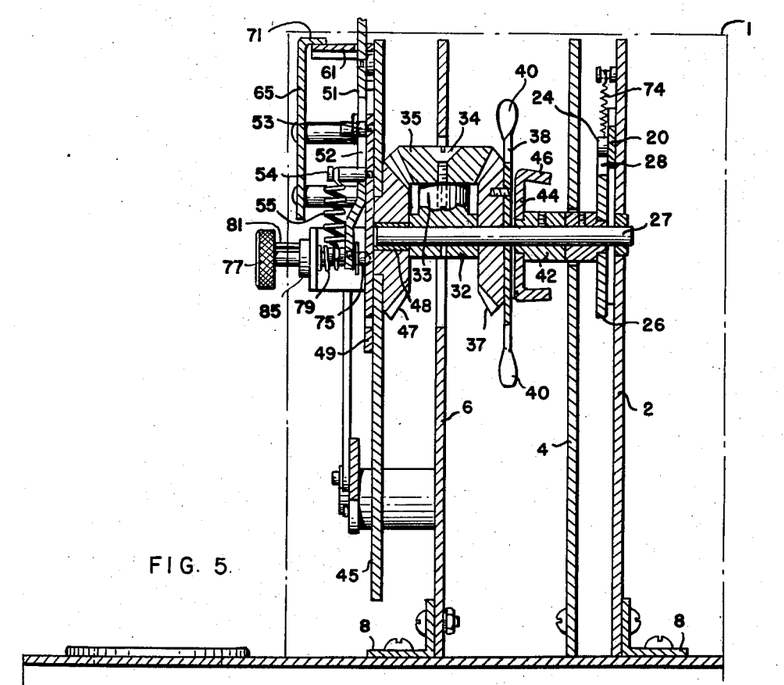
Figure 5 is a generally vertical section taken on the broken plane indicated at 5—5 in Figure 6.
Figure 6:
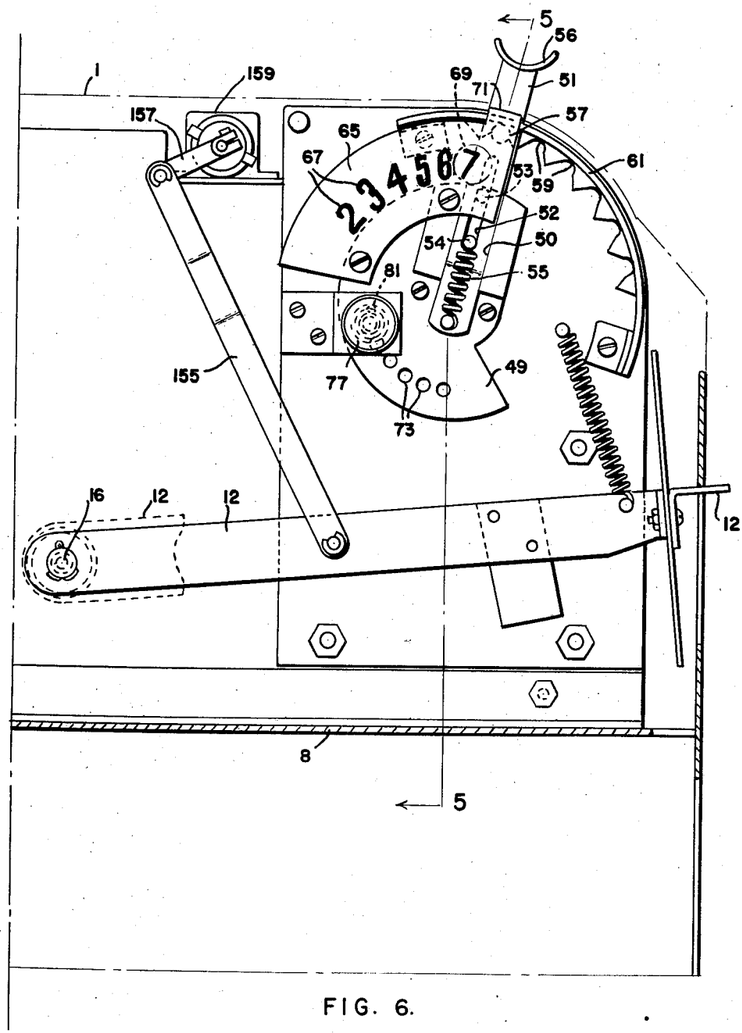
Figure 6 is a side elevation showing, in particular, the zone setting mechanism.

Figures 1 and 2, primarily, show the operating mechanism of this machine which is arranged to be located in a suitable housing 1 which need not be described in detail except to say that such housing may be locked in conventional fashion and is provided with apertures for the passage of an issued ticket, for the passage therethrough of the operating lever and for the passage therethrough of a setting device. The housing may be mounted in any suitable fashion in the vehicle as, for example, by securing it to a stanchion located at the entrance and adjacent to the operator.

The operating parts of the machine are supported by a frame comprising mainly three upright plates 2, 4 and 6 connected together in parallel arrangement through suitable bolts and spacers. A cover strip 7 is located between the upper forward and rear edges of the plates 2 and 4 to enclose the major parts of the operating mechanism to protect them against dirt or foreign materials. Flanges such as 8 are provided so that the operating unit may be secured to its supporting and enclosing housing.

A multiple-armed operating lever 12 provided with a handle 14 to receive the pressure of the fingers is pivoted at 16 to the vertical plates and is normally urged upwardly by a spring 13 connected to it and anchored to the plate 2.

Pivoted to the lever 12 at 18 is a link 20 which is urged clockwise, as viewed in Figure 1, about the pivot by a spring 22 acting between its lower end and a pin carried by lever 12. The link 20 carries near its upper end a pin 24 which is arranged to enter notches 28 in the periphery of a disc 26 which is provided with a hub secured to a transversely extending shaft 27. Extending in an arc adjacent to the periphery of the disc 26 is a flange 30 supported by the plate 4, which flange defines an arcuate passage for the pin 24 when it moves as described hereafter during engagement within a notch 28 of the disc 26. As will also be apparent hereafter, the pin 24 on its return movement moves along the left-hand side of this flange as viewed in Figure 1.

Secured to the shaft 27 is a hub 32 which has an arm 33 rotatably supporting on a screw 34 a bevel pinion 35. Plate 6 is provided with a circular clearance opening for the bodily rotation of the pinion 35 about the axis of shaft 27. Pinion 35 meshes with a bevel gear 37 which is journalled upon the shaft 27 and is secured to a pinwheel 38 provided with ticket feeding pins 40 which provide cylindrical outlines arranged for close fits in openings in the ticket supply strip. As will hereafter more fully appear, the issue of each ticket involves the advance of the pinwheel through an arc corresponding to the angular displacement of two pins 40.

Secured to the shaft 27 is the hub 42 carrying a disc 44 which is provided with five ears 46. There are five notches 28 in disc 26 corresponding to these ears and there are five feeding pins 40. A second bevel gear 47 meshing with pinion 35 is, during normal ticket issuing operation, stationary, and it will be evident that the arrangement of parts is such that, while shaft 27 and discs 26 and 44 rotate through one-fifth of a revolution, the pinwheel 38 will rotate in the same direction through two-fifths of a revolution, i. e. an angular amount equal to twice the angular spacing of successive pins 40.

The bevel gear 47 is mounted on sleeve 48 embracing the shaft 27 and has its hub passing through auxiliary supporting plate 45 and secured to plate 49. This plate, accordingly, moves angularly with the gear 47. A guideway 50 is provided by a pair of plates secured to plate 49 and serves for the guidance of slide 51 which is provided with an elongated slot 52 embracing pin 53 secured in plate 49 and provided with a washer to retain the slide in place and also a pin 54 fixed in plate 49 which serves as an anchorage for spring 55 acting upon the lower end of slide 51 to urge it upwardly. The slide 51 is provided with a finger saddle 56 by which it may be manually depressed against the action of spring 55 to disengage pin 57 from notches 59 in member 61 which is secured to the frame and carries a series of numbers 63. An arcuate plate 65 is secured to the plate 59 to rotate therewith and is provided with numbers 67 which selectively become visible as the plate is adjusted through opening 69 in the casing. The plate 65 carries a pointer 71 against which the numbers 63 may be read. The plate 49 is provided with an arcuate series of holes 73 into which there may be projected pin 75 having a head 77 under the action of a compression spring 79. The head 77 carries a pin 81 which may be moved into or out of alignment with an elongated slot 83 provided in disc 85 secured to the frame. When the pin 81 is moved out of alignment with the slot 83, the pin 75 is held out of engagement with the holes 73. However, if the pin 81 is brought into alignment with the slot 83, the pin 75 may be moved inwardly by the spring 79 into an aligned hole 73. The purpose of this arrangement will become apparent hereafter.

Figure 10:
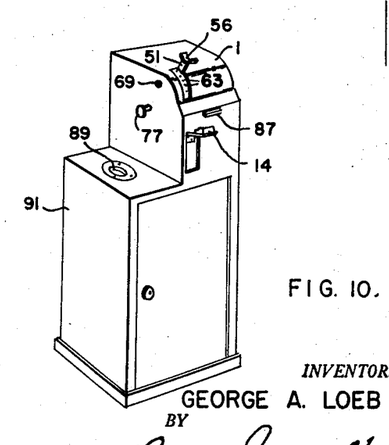
Figure 10 is a perspective view showing the exterior of the complete ticket issuing machine.

Referring to Figure 10, the housing 1 is provided with openings for the passage of the handle 14 of lever 12 and for the passage of the slide 51 as indicated. It is also provided with an opening 87 for the exit of tickets and with an opening for the projection of the head 77 of pin 75.

The housing is provided with an opening 89 into which tickets returned by the patrons may be placed for collection in a receptacle (not shown) contained in the portion 91 of the housing 1.

A ticket strip guide is provided by a pair of fixed arcuate flanges 58, one of which is shown in Figure 2, between which the pins 40 of the pinwheel project. Covering the passageway for the ticket strip is a cover member 60 pivoted on a fixed pin 61 and normally urged to closed position by a spring 62. This cover may be lifted to facilitate placement of the ticket strip. Rollers 64 and 66 serve for the guidance of the ticket strip which may be provided in fan folded fashion in the space in the housing below the ticket issuing mechanism. The fan folded ticket strip passes from its supply over the roller 64 and under the roller 66 and thence over the curved portion 68 of strip 69 between the guide flanges 58 and the cover 60. This ticket strip is provided with openings for the reception of the pins 40 spaced to the extent of the circumferential spacing between the pins, as hereafter more fully described.

A bell crank 70 is pivoted on a fixed pin 72 carried by plate 2 and is urged clockwise as viewed in Figure 1 by a spring 74. The lower arm of this bell crank carries a pin 76 receivable in the notches 28 in the disc 26. The end 78 of the other arm of the bell crank is engageable by the rounded hook end 80 of the link 20.

Pivoted on a fixed pin 82 carried by plate 2 is a lever 84 provided with a laterally extending pin 86 which is arranged to be engaged by the lower edge of the lever 12 when the latter is depressed. Pivoted to lever 84 at 88 is a link 90 which is pulled upward by a spring 92 anchored to plate 2. At 94 the link 90 is pivoted to a lever 96 which is pivoted at 98 to the plate 4. The rearwardly extending arm of this lever 96 passes through an opening in the plate 4 as indicated in Figure 2. Lever 96 is provided with an ear 100 which is movable into the path of the ears 46 carried by the plate 44. It is also provided with a hook 106 on a depending arm thereof. This hook 106 is adapted to engage a pin 104 carried by the rearwardly extending arm of a lever 102 having a hub 110 pivoted on a fixed pin 108. This hub carries a projecting arm 112 which is arranged to engage the link 20 during operation of the mechanism. A sleeve 114 is mounted on a cylindrical portion of the pin 104 and is embraced by a fork in the end of a lever 116 pivoted at 118 and carrying a leaf spring 120 which supports a hammer 122 arranged to strike a bell 124 carried by the plate 2. A link 126 is pivoted at 128 to the lever 12 and is slotted at 130 to embrace a portion of the pin 104. A strong spring 134 is connected to the upper end of link 126 at 132 and also to the sleeve 114 carried by the pin 104. This spring tends to expand and so normally holds the pin 104 in the lower end of the slot 130.

An upwardly and forwardly extending arm 136 of the lever 102 has an end 138 which is adapted to enter between the ears 46 of the plate 44.

A fixed knife blade 140 is mounted between the plates 4 and 6 and cooperating with this there is the movable knife 142 provided with an extension 143 overlapping the fixed blade to insure proper close cooperation of the cutting edges. The movable blade is interlocked with a plate 154 so as to be held in flatwise engagement with this plate but so as to have sliding movement relative thereto, the sliding engagement being provided by ears 151 on the plate 154 passing through a rectangular opening in the knife blade to engage behind the blade. An ear 153 provided on the plate 154 engages one of the transverse posts between plates 4 and 6. The blade slides on a pair of ledges carried by these plates. A link 144 pivoted at 150 to the lever 102 engages within the opening in the movable knife blade 142, the link 144 being pulled inwardly by the spring 146 which is anchored to the lever 102 at 148. A lip 152 on the plate 154 serves to aid in guiding the ticket outwardly.

A link 155 connects one arm of lever 12 to the operating arm 157 of a counter 159 arranged to register the number of tickets issued by the machine.

The operation of the mechanism described is as follows on the assumption that bevel gear 47 is stationary:

Assuming all of the parts in the initial position illustrated, depression of the lever 12 against the action of the springs 13 and 134 will first effect downward movement of the pin 24 into a notch 28 of the disc 26 which is aligned therewith by reason of the fact that the disc is locked in a definite position by the location of pin 76 in another of the notches 28. As the pin 24 moves downwardly into the notch presented to it, the hook 80 of the link 20 will engage the end 78 of the lever 70 rocking this counterclockwise, as viewed in Figure 1, against the action of spring 74 to release the pin 76 from its notch 28. The further movement of the lever 12 will cause the pin 24 to start rotation of the disc 26. Immediately after rotation begins, the end of the hook 80, by moving forwardly, will clear the end 78 of lever 70, releasing it so that the pin 76 will drop against the periphery of the disc 26 since the notch previously engaged by this pin will have moved out of alignment with it. In the meanwhile, the pin 24 will pass behind and below the flange 30. The result is an immediate locking action preventing upward movement of the lever 12 because of the fact that a release of the key lever would now cause the upper end of link 20 to engage the end 78 of lever 70 and, since it cannot rise away from the axis of the disc 26 by reason of the flange 30, it must remain within the notch 28 so that it is impossible for the mechanism to get out of timing. The lever 12, however, can continue to move downwardly. As it does so, the shaft 27 is rotated and with it the hub 32 which carries the pinion 35. Since bevel gear 47 is now stationary, the result is to impart to bevel gear 37 and pinwheel 38 a rotation which is twice that of the shaft 27. The total movement of the disc 26 is a fifth of a revolution in each operation which, accordingly, corresponds to two-fifths of a revolution of the pinwheel, advancing the ticket strip through a distance equal to double the spacings between the centers of the holes therein. The final position attained by the pin 24 on downward movement of the lever 12 is slightly below the lower end of the flange 30.

As the downward movement of the lever 12 takes place, the link 126 is pulled downwardly, the edges of the slot 130 therein moving downwardly over the pin 104. The result is a tensioning of the spring 134. The pin 104 is restrained from movement by engagement by the hook 106 on the lever 96. The tensioning of the spring 134 continues until the lever 12 engages the pin 86 on lever 84 to pull down the link 90 and rock the lever 96 counterclockwise, as viewed in Figure 2, against the action of spring 92. Before tripping action occurs the lever 96 will be rocked into such position as to bring the ear 100 into the path of one of the ears 46 on the disc 44. Finally, at the limit of downward motion, the hook 106 will clear the pin 104 to release this pin. This release occurs simultaneously with the completion of a fifth of a revolution of the disc 26. The spring 134 will now cause the pin 104 to snap downwardly to effect the substantially simultaneous occurrence of several events.

One of these is the rocking of the lever 116 to cause the hammer 122 to strike the bell 124. The spring 120 is so arranged that in the ultimate position attained by the lever 116 the hammer will slightly clear the bell so that the sound of the bell will not be muffled by contact of the hammer with it, the hammer striking the bell through inertia when the lever 116 is snapped clockwise.

Another event which occurs is the rocking of the lever 102 which effects several results. One of these is a sharp upward movement of the movable knife 142 which will sever the length of the ticket which, by the action of the pinwheel, has been projected between the movable and fixed knives over the upper surface of the lip 152. A rapid cutting action to produce a clean cut is thus effected. At the same time, the end 138 of the upper arm 136 of lever 102 is carried between a pair of the ears 46. The entry of the ear 100 into the path of one of these ears will limit forward movement of the disc 26; the entry between the ears of the lever end 138 will prevent reverse rotation of the disc. This prevention of reverse rotation is important because the quick action may otherwise cause rebound. While at this time the pin 76 should drop within a notch 28 in the disc 26, this action may not be sufficiently quick to restrain overrun or rebound if the lever is depressed very rapidly. The location of the pin 76 in a notch 28 determines accurately the final position of the disc 26 to secure a precisely adjusted length of projection of the ticket strip at the instant of cutting.

Another event which now occurs is the rocking of the lever 112 to kick the link 20 forwardly to disengage the pin 24 from its notch 28. This action forces the pin 24 to the left of the flange 30, as viewed in Figure 1.

If the lever 12 is now released, the pin 24 will rise above and in front of the flange 30 so that as the lever 12 is restored by the spring 13 toward its initial position the pin 24 will ride on the upper and forward surface of this flange back to the initial position indicated in Figure 1.

The operation of the spring 134 will have restored the pin 104 to the bottom of the slot 130. It will be noted, accordingly, that as the lever 12 rises under the action of the spring 13, the spring 134 will, in effect, be solely supported by the link 26 reacting between the pin 132 at its upper end and the lower end of the slot 130. Accordingly, the spring 134 occasions no resistance to the upward movement of the lever 12. As the link 126 rises carrying the pin 104 with it, the lever 116 will be moved counterclockwise, as viewed in Figure 2, to withdraw the hammer 122 away from the bell and the lever 102 will be rocked clockwise. The result is to move the movable knife downwardly, to retract the end 138 of arm 136 from between the ears 46, and to rock the lever 112 away from the link 20 so that after the pin 24 clears the flange 30 the link 20 will rock counterclockwise under the action of spring 22 to restore the pin 24 to its initial position at the entrance of a notch 28.

When the pin 104 clears the hook 106 the lever 96 will be rocked by the action of spring 92 which will also lift through the link 90 the lever 84. Accordingly, the hook 106 will again engage beneath the pin 104 and, at the same time, the ear 100 will be withdrawn from the path of the ears 46. The result will be that when the lever 12 again attains its uppermost position, determined by the engagement of its upper edge with the hub 110, all of the parts will have been restored to their initial positions with the exception that the disc 26 and its associated parts will have been rotated through one-fifth of a revolution and the pinwheel and its associated parts will have been rotated through two-fifths of a revolution.

It will be evident from the foregoing that there is provided a quite simple mechanism with a minimum of possibility of its getting out of order even if operated by unskilled persons. The complete operation occurs with a minimum of pressure applied to the operating lever and with a minimum of stroke applied thereto. Restoration of the lever is effected even though the spring 13 is relatively light since the restoration does not involve the overcoming of the heavy spring tension applied by the spring 134 to secure positive and extremely rapid operation of the cutting mechanism.

Figure 7:
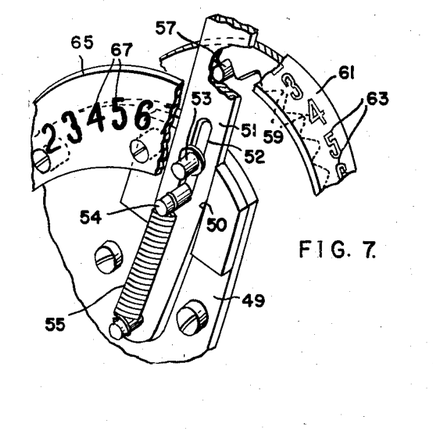
Figure 7 is a perspective view of certain details of the zone setting mechanism.
Figure 8:
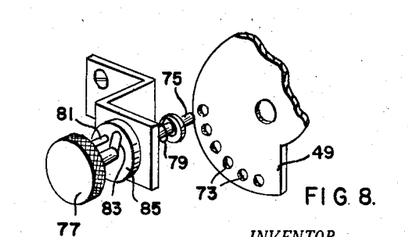
Figure 8 is a fragmentary perspective view showing latching means for the zone setting mechanism.
Figure 9:
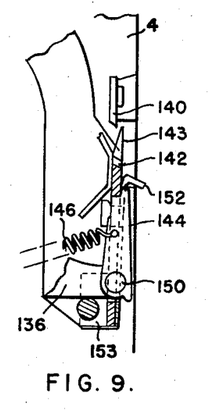
Figure 9 is a fragmentary sectional view showing details of the ticket strip cutting means.

Shifting of the bevel gear 47 changes the phase relationship between the pinwheel 40 and the severing knife blades and, accordingly, shifts the position of severance of the tickets. It is the adjustment of the bevel gear 47 which produces the selectivity in issuance of tickets for various zones. The position of the gear 47 is indicated by both of the sets of numerals shown in Figure 7. For the sake of differentiation, and to avoid confusion, these two sets may be in different colors and it may be assumed for the following description that the numerals 63 are red and that the numerals 67 are black. The red numerals range from one to six while the black numerals range from two to seven. The arrangement is such that the sum of the red numeral 63 indicated by the pointer 71 and the black numeral 67 visible through the opening 69 is eight. (The particular machine disclosed is for use in buses operating through a maximum of seven zones. It will be understood that a larger or smaller series of numbers may be provided depending upon the number of zones involved, but for consistency of description the assumption of seven zones will be made herein).

Figure 11:
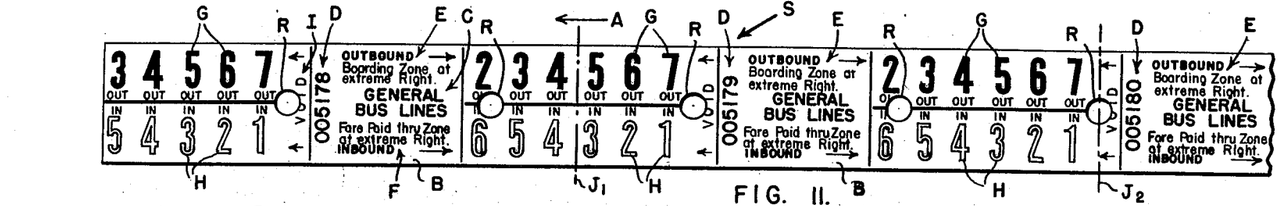
Figure 11 is a plan view showing a portion of a ticket strip which may be used in the machine.

Assume that the operation involved is along a route running from the center of a city and some outlying district, with the central city zone designated 1 and the zones increasing in number to the most distant. Under ordinary traffic conditions, this would generally lead to a situation in which inbound trips starting from a zone of higher number and terminating in a zone of lesser number would involve payment of fares on entering the bus, while outbound trips would involve payment of fares on leaving the bus. For this situation, the ticket strip supplied to the machine may be as illustrated in Figure 11 at S. This ticket strip would be fed in the direction indicated by the arrow A. The strip is provided with equally spaced feeding holes R and, as pointed out above, the feed of the ticket strip in each operation (neglecting phase shifts occasioned by adjustment of gear 47) is through a distance corresponding to twice the spacing of the holes. A repeat of printed matter on the ticket strip accordingly occurs in a length corresponding to twice the spacing of the holes.

In each repeat of the ticket strip there is an area B containing certain information. Each such area, for example, may contain a designation of the line as at C, and a serial number D, these serial numbers being sequential along the strip. Informative legends E and F correspond, respectively, to the sets of numerals G and H. The first set G correspond to the black numerals 67 visible through the opening 69, while the second numerals H correspond to those indicated at 63. Desirably, for ready differentiation, the numerals are colored to correspond to those indicated in the machine, i. e. the numerals G may be black and the numerals H red. In similar fashion, the legends E and F may be colored to correspond to their sets of numerals. It may be noted that the vertically aligned numerals of the sets G and H are those which, at any time, simultaneously appear in the machine. As will become apparent, the numeral at the extreme right of a ticket in the particular set used is of significance, while the numeral appearing at the extreme left of a ticket has no significance but is merely the accidental result of the issuance of a preceding ticket. Accordingly, there may be a designation "void" as at I to indicate that the numerals to the left of the area B are to be disregarded.

The system involved may now be described with reference to particular examples, as follows:

Assume, first, an inbound trip starting in zone 7 and running to zone 1 in which the operator of the bus collects fares upon a patron's entrance.

Assume, first, that a patron enters in zone 7 and states that he is going to another point in zone 7. In this case, he will pay the appropriate fare but will receive no check. In general, there is no particular reason for the issuance of a check in such a situation though, as will be evident, the system and the machine could be readily adapted for such issuance.

Assume that another patron enters in zone 7 and states that he is going to zone 4. In this case, the driver will receive the appropriate fare for the indicated trip and will set the gear 47 to such position that the red 4 of the group 63 will be indicated by the index pointer 71. This is accomplished by the operator's depressing the slide 51 and by moving it, moving the pointer 71 and its attached parts including the gear 47. At this time, the pin 77 is withdrawn so as not to interfere with such adjustment. By depression of the handle 14 a ticket is then issued which will be the ticket indicated in Figure 12 (or a ticket having the same validating characteristics) cutting taking place along the line indicated at $J_1$ in Figure 11.

Figure 12:
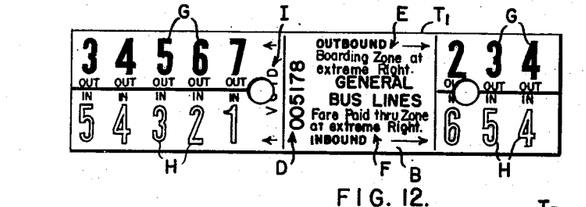
Figures 12 to 17, inclusive, show typical tickets issued under various conditions in accordance with the invention.

The patron upon leaving the bus in zone 4 will present the ticket $T_1$ of Figure 12 and, since this indicates that he has paid the proper fare to zone 4, his exit will be unquestioned. However, if accidentally or intentionally he should ride further, for example, into zone 3, it will be evident that he has not paid the correct fare and the operator may demand of him the additional fare required. It may be noted that an attempt to cut off more of the right-hand portion of the ticket than was cut off by the machine, for example, between the 4 and 5 of the series of numerals H would indicate a greater fare obligation than that involved in the original ticket. The patron, therefore, cannot cheat the company. If the patron loses his ticket, he will be obliged to pay the full fare from the beginning of the trip to the zone of exit.

The numbers appearing at the left of the ticket $T_1$ are merely the results of the severance of a preceding ticket and have no significance. In the particular example, they would merely indicate that the ticket issued to the preceding patron was issued for a ride to zone 6. In other words, the numeral 5 appearing in the group H at the left of the ticket merely means that the numeral of the group H appearing at the extreme right of the preceding ticket was 6.

Figure 13:
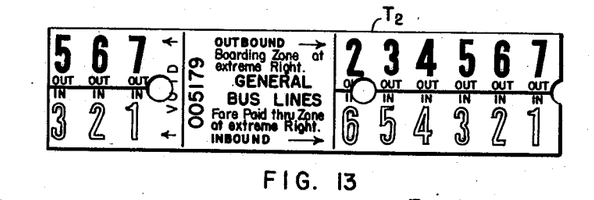

As a further example, reference may be made to the ticket $T_2$ in Figure 13 which is the ticket which would be issued to the patron following the one receiving ticket $T_1$ and which is issued for a ride to zone 1. In this case, severance of the strip indicated in Figure 11 would occur at $J_2$.

It will be evident from the above that, when fares are paid on an entering basis, the phase of the ticket strip is shifted with respect to the knife by the adjustment of gear 47 so as to cut off the ticket to indicate at its extreme right the zone through which the fare was paid. The system does not afford a rigid control on the proper fare collection by the driver and it is contemplated that the usual fare box will be used as at the present time. However, grossly improper operations on the part of the driver may be detected by examination of the collected tickets which, when put in the order of their serial numbers, should show a continuity of the pattern of issuance. The object of the present invention is primarily the facilitation of proper fare collection in a zoned transportation system without providing rigid control on the operator. The counter 159 counts the number of operations of the machine but does not indicate values.

Assume now that the bus begins an outbound trip. In this case, it would normally be desirable to have the fares paid as the patrons leave the bus. Using the same ticket strip S, operations will now be as follows:

In the first zone, zone 1, there is no necessity for issuing tickets. If a patron leaves the bus in zone 1 he will pay the minimum fare. Furthermore, if he leaves the bus in a zone subsequent to 1, but presents no ticket, the assumption will be made that he entered in zone 1 and would, therefore, be required to pay the appropriate, i. e. the maximum, fare to the zone of exit.

Patrons entering in zone 2 and in subsequent zones will issue tickets to themselves. To secure this end, the operator will set the lever 51 so as to exhibit through the opening 69 the numeral of the group 67 corresponding to the zone through which the bus is passing. Locking of the member 49 and gear 47 is then accomplished by pin 77 so that a patron cannot by manipulation of lever 51 change the machine setting. The patron then issues a ticket by manipulation of handle 14.

Figure 14:
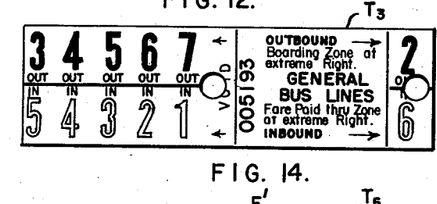

A typical ticket issued in zone 2 is indicated at $T_3$ in Figure 14. This ticket indicates by the 2 at the extreme right of the numeral series G that the patron entered in zone 2. When the ticket is surrendered in a subsequent zone, the operator may at a glance determine the zone of entry and, accordingly, the appropriate fare to be collected.

Figure 15:
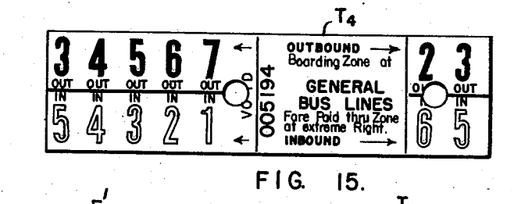

Ticket $T_4$ in Figure 15 illustrates the first ticket which would be issued in zone 3. Subsequent tickets issued in zone 3 would be similar with the exception that the numeral 4 would appear at the extreme left in the numeral series G.

In the pay-as-you-leave system just described there is an additional check of proper operation on the operator since it is evident that the indicated boarding zones should increase continuously with the serial numbers of the tickets. While an improper ticket could be issued to the final patron entering in a zone, unless this patron was in collusion with the operator, the situation would be readily detected.

It will be evident from the above that the same ticket strip S may be used for both inbound and outbound trips provided that a pay-as-you-enter system was used for the inbound trip and a pay-as-you-leave for the outbound trip. As previously mentioned, under certain circumstances, the paying system might be varied. In such case, a different strip of tickets would be provided as will now be described.

Figure 16:
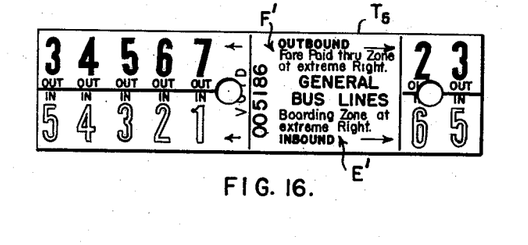

Ticket $T_5$ in Figure 16 illustrates the ticket which would be issued in an inbound trip on a pay-as-you-leave basis and shows at the extreme right of the numeral series H the boarding zone. It will be noted that the ticket (and, of course, the strip from which it was issued) is the same as previously described with the exception that the designations of significance of the numerals are reversed as indicated at E' and F'. The ticket $T_5$ indicates that the patron boarded the bus in zone 5 in the inbound trip. The patron in this case would issue the ticket to himself, the operator having set the machine so that the indicated numeral of the group 63 would indicate the zone through which the bus was passing, locking being effected by the pin 77.

The last mentioned strip would also be suitable for a pay-as-you-enter system in an outbound trip, the tickets being then issued by the operator to indicate in the series of numerals G the zone through which the fare was paid at the time of ticket issuance. In setting the machine for this type operation, the operator would, of course, view the numerals through the opening 69.

Figure 17:
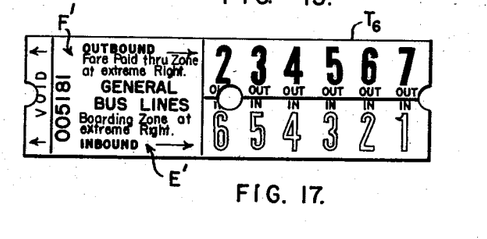

Ticket $T_6$ of Figure 17 indicates that the fare was paid through zone 7.

It will be clear from the above that there is provided a system in accordance with the invention by which zoned fare control is attained in a simple fashion particularly adapted for one man operation of vehicles. It will be evident that various changes in details may be used without departing from the invention as defined in the following claims.

What is claimed is:

1. A ticket issuing machine comprising means for guiding and feeding a ticket strip, means for severing the ticket strip at a fixed position to form tickets therefrom, means for effecting sequential operations of the feeding and severing means in each cycle of operation, said feeding means comprising a member engaging the strip to impart to the strip an invariable advancing movement in each cycle of operation, and means forming a part of said means for effecting operations of the feeding means for adjusting in discrete steps, less than the strip advancing movement in a single cycle, the phase of the member relative to the severing means existing at the time of operation of the severing means.

2. A ticket issuing machine according to claim 1 provided with means for indicating the position of adjustment of the phase of the member relative to the severing means.

3. A ticket issuing machine comprising means for guiding and feeding a ticket strip, means for severing the ticket strip to form tickets therefrom, means for effecting sequential operations of the feeding and severing means in each cycle of operation, the last mentioned means comprising a planetary gear mechanism through which the feeding means is driven, said feeding means effecting an invariable strip advancing movement in each cycle of operation, and means for adjusting said planetary gear mechanism for adjusting in discrete steps, less than the strip advancing movement of the feeding means in a single cycle, the phase of the feeding means relative to the severing means existing at the time of operation of the severing means.

4. A ticket issuing machine according to claim 3 provided with means for indicating the position of adjustment of the phase of the feeding means relative to the severing means.

References Cited in the file of this patent

UNITED STATES PATENTS

| | | |
|---|---|---|
| 509,854 | Sawyer | Nov. 28, 1893 |
| 1,455,050 | Heath | May 15, 1923 |
| 1,945,218 | Fishburn et al. | Jan. 30, 1934 |
| 2,331,316 | Freedman | Oct. 12, 1943 |
| 2,751,007 | Maul | June 19, 1956 |